(12) United States Patent
Kwon et al.

(10) Patent No.: US 10,986,050 B2
(45) Date of Patent: Apr. 20, 2021

(54) METHOD AND APPARATUS FOR PROVIDING IN-GAME MESSENGER SERVICE

(71) Applicant: SMILEGATE ENTERTAINMENT, INC., Gyeonggi-do (KR)

(72) Inventors: Hyuk Bin Kwon, Gyeonggi-do (KR); Ki Dae Lee, Gyeonggi-do (KR); Joo Young Lee, Seoul (KR); Su Hyeok Cha, Seoul (KR); Gie Young Lee, Seoul (KR); Dae Hyun Ka, Seoul (KR); Yang Soo Ahn, Seoul (KR)

(73) Assignee: SMILEGATE ENTERTAINMENT, INC., Gyeonggi-do (KR)

( * ) Notice: Subject to any disclaimer, the term of this patent is extended or adjusted under 35 U.S.C. 154(b) by 98 days.

(21) Appl. No.: 15/761,230

(22) PCT Filed: Sep. 23, 2016

(86) PCT No.: PCT/KR2016/010718
§ 371 (c)(1),
(2) Date: Mar. 19, 2018

(87) PCT Pub. No.: WO2017/052309
PCT Pub. Date: Mar. 30, 2017

(65) Prior Publication Data
US 2018/0270174 A1    Sep. 20, 2018

(30) Foreign Application Priority Data

Sep. 25, 2015    (KR) .................... 10-2015-0136575

(51) Int. Cl.
*H04L 12/58*    (2006.01)
*G06Q 10/00*    (2012.01)
(Continued)

(52) U.S. Cl.
CPC ............ *H04L 51/046* (2013.01); *A63F 13/87* (2014.09); *G06F 3/04817* (2013.01); *G06F 9/44* (2013.01);
(Continued)

(58) Field of Classification Search
None
See application file for complete search history.

(56) References Cited

U.S. PATENT DOCUMENTS

2012/0209571 A1* 8/2012 Peterson ............. G06F 11/3616
702/186
2014/0024450 A1* 1/2014 Ramachandran ....... A63F 13/10
463/31
(Continued)

FOREIGN PATENT DOCUMENTS

KR    10-2009-0022503    3/2009
KR    10-2009-0075124    7/2009
(Continued)

OTHER PUBLICATIONS

International Search Report dated Dec. 19, 2016 for PCT/KR2016/010718.

*Primary Examiner* — Glenford J Madamba (57) ABSTRACT

Disclosed is a method for providing an in-game messenger service comprising: storing a game program in a platform server; associating an in-game messenger program for the game program; and transmitting the in-game messenger program associated with the game program to a user terminal as the game program is transmitted from the platform server to the user terminal.

12 Claims, 5 Drawing Sheets

(51) Int. Cl.
  *G06F 9/44*    (2018.01)
  *G06Q 50/00*   (2012.01)
  *G06Q 50/10*   (2012.01)
  *A63F 13/87*   (2014.01)
  *G06F 3/0481*  (2013.01)
  *A63F 13/795*  (2014.01)

(52) U.S. Cl.
  CPC ............ *G06Q 10/00* (2013.01); *G06Q 50/01* (2013.01); *G06Q 50/10* (2013.01); *A63F 13/795* (2014.09); *A63F 2300/537* (2013.01); *A63F 2300/556* (2013.01); *A63F 2300/572* (2013.01)

(56) References Cited

U.S. PATENT DOCUMENTS

2016/0001187 A1\* 1/2016 Sepulveda ............... A63F 13/77
 463/31
2016/0149967 A1\* 5/2016 Lewis .................... H04L 51/046
 715/753

FOREIGN PATENT DOCUMENTS

| KR | 10-2010-0059290 | 6/2010 |
| KR | 10-2011-0066603 | 6/2011 |
| KR | 10-2013-0083024 | 7/2013 |
| KR | 10-2013-0120678 | 11/2013 |

\* cited by examiner

METHOD AND APPARATUS FOR PROVIDING IN-GAME MESSENGER SERVICE

This application claims the priority of Korean Patent Application No. 10-2015-0136575, filed on Sep. 25, 2015 in the KIPO (Korean Intellectual Property Office), the disclosure of which is incorporated herein entirely by reference. Further, this application is the National Stage application of International Application No. PCT/KR2016/010718, filed Sep. 23, 2016, which designates the United States and was published in Korean. Each of these applications is hereby incorporated by reference in their entirety into the present application.

TECHNICAL FIELD

The present disclosure relates to a method and apparatus for providing an in-game messenger service, and more particularly, to a method and apparatus for providing an in-game messenger service to a user terminal in association with a game program at a platform server that provides various kinds of game services so that a social network between users who have downloaded the program from the same platform server is formed based on the platform server.

BACKGROUND ART

An in-game messenger is widely used for communication between users in an on-line game. A method for searching a game opponent through an instant messenger other than a game is disclosed in Korean Patent Application No. 2012-0043747 and the like. However, the existing instant messenger is actually separated from the game. Thus, when a user wants to use a messenger during game play, the user should activate a messenger window separately. Also, between different kinds of game, it is impossible to send a message through the in-game messenger.

DISCLOSURE OF THE INVENTION

Technical Problem

Therefore, the present disclosure is directed to providing a method and apparatus for providing an in-game messenger service in which an in-game messenger and a game service are combined at a platform that provides a game service.

Technical Solution

In one general aspect, there is provided a method for providing an in-game messenger service, comprising: storing a game program in a platform server; associating an in-game messenger program for the game program; and transmitting the in-game messenger program associated with the game program to a user terminal as the game program is transmitted from the platform server to the user terminal.

In an embodiment of the present disclosure, as the game program is transmitted to the user terminal, the in-game messenger program associated with the game program may be automatically transmitted to the user terminal, and a display window of the in-game messenger may be displayed on a screen of the game program displayed at the user terminal.

In an embodiment of the present disclosure, an icon for activating the in-game messenger may be displayed on the game program screen, and as the icon is selected, the in-game messenger display window may be displayed.

In an embodiment of the present disclosure, the in-game messenger program may be capable of being activated at the user terminal even when the game is not played.

In an embodiment of the present disclosure, the in-game messenger program may be jointly associated with two or more games stored in the platform server.

In an embodiment of the present disclosure, information of another user using the in-game messenger and information of a game played by another user may be displayed in the in-game messenger display window.

In an embodiment of the present disclosure, the game information may be information of a game transmitted to another user from the platform server.

In an embodiment of the present disclosure, the in-game messenger program may be embedded in a software development kit provided from the platform server.

In another aspect of the present disclosure, there is also provided a computer-readable recording medium, on which a program command for implementing the above method for providing an in-game messenger service is recorded.

In another aspect of the present disclosure, there is also provided an in-game messenger apparatus, comprising: a user terminal 110; and a platform server 120 connected to the user terminal through a network, wherein the platform server 120 includes: a game program storage unit 130; a game program transmission unit 140 configured to transmit a game program stored in the game program storage unit 130 to the user terminal 110 according to a transmission signal received from the user terminal 110; and an in-game messenger transmission unit 150 configured to transmit an in-game messenger program to the user terminal 110 when the game program is transmitted from the game program transmission unit 140.

In an embodiment of the present disclosure, when the game program is transmitted from the game program transmission unit 140 to the user terminal 110, the in-game messenger transmission unit 150 may automatically transmit an in-game messenger program to the user terminal 110.

In an embodiment of the present disclosure, the in-game messenger program may be jointly associated with two or more games stored in the platform server.

In an embodiment of the present disclosure, information of another user using the in-game messenger and information of a game played by another user may be displayed in an in-game messenger display window that is transmitted to the user terminal and activated.

In another aspect of the present disclosure, there is also provided a computer-readable recording medium, on which a program command for operating the above in-game messenger apparatus is recorded.

Advantageous Effects

According to the present disclosure, an in-game messenger is transmitted to a user terminal in association with a game program at a platform server that provides various kinds of game services. Thus, a social network between users who have downloaded a game program from the same platform server may be formed based on the platform server. In addition, the same messenger may be advantageously used for different kinds of games as long as the games are downloaded from the same platform server. Further, the in-game messenger provided together with the game may be independently activated separately from the game, so that a message may be sent even when the game is not played.

MODE FOR CARRYING OUT THE INVENTION

Hereinafter, embodiments and examples of the present disclosure will be described in detail with reference to the accompanying drawings so as to be easily implemented by those skilled in the art.

However, the present disclosure may be implemented in many different forms and is not limited to the embodiments and examples described herein. In order to clearly illustrate the present disclosure in the drawings, any portion which is not related to the description is omitted, and like reference numerals are given to like elements throughout the specification.

Throughout the specification, when any part is described as "including" any component, this means that any other component can be further included, without excluding other components, as long as being stated otherwise.

The terms "about", "substantially" or the like used in the specification mean that, when an inherent allowable process or material error is proposed, the error is in or near a corresponding numeral range, and they are used to prevent any unconscientious infringer from unfairly using an accurate or absolute numeral disclosed for better understanding of the present disclosure. Also, throughout the specification, an expression "step of . . . " or " . . . step" does not mean "step for . . . ".

Throughout the specification, the term "combination thereof" included in a Marcush expression means a mixture or combination of at least one element selected from the group consisting of elements expressed inn a Marcush form, and this means at least one selected from the group consisting of the elements.

Throughout the specification, the term "A and/or B" means "A or B, or A and B".

In order to solve the above-described problem, the present disclosure provides a service method in which an in-game messenger is transmitted from the platform server in association with a game program when a user terminal receives the game program from a platform server. The in-game messenger is displayed on a game screen played at the user terminal but may also be activated according to an operation signal of the user terminal even when the game is not played.

That is, unlike an existing method in which an in-game messenger is activated in an existing game program, in the present disclosure, the in-game messenger program is associated with a game program at the platform server, and thus, the in-game messenger is transmitted from the platform server as the user terminal receives the game program, so that a social network may be configured based on the platform server with another user who has received a different kind of game from the platform server.

In another embodiment of the present disclosure, the in-game messenger provided from the platform server may be independently activated separately from the game, so that a message may be sent even when the game is not played.

Thus, if in-game messengers are provided from the same platform server, a network may be formed among users of different games by using the messenger of the present disclosure, so that the users may exchange messages and check game information (for example, preferred game type, game level or the like).

Figure 1:
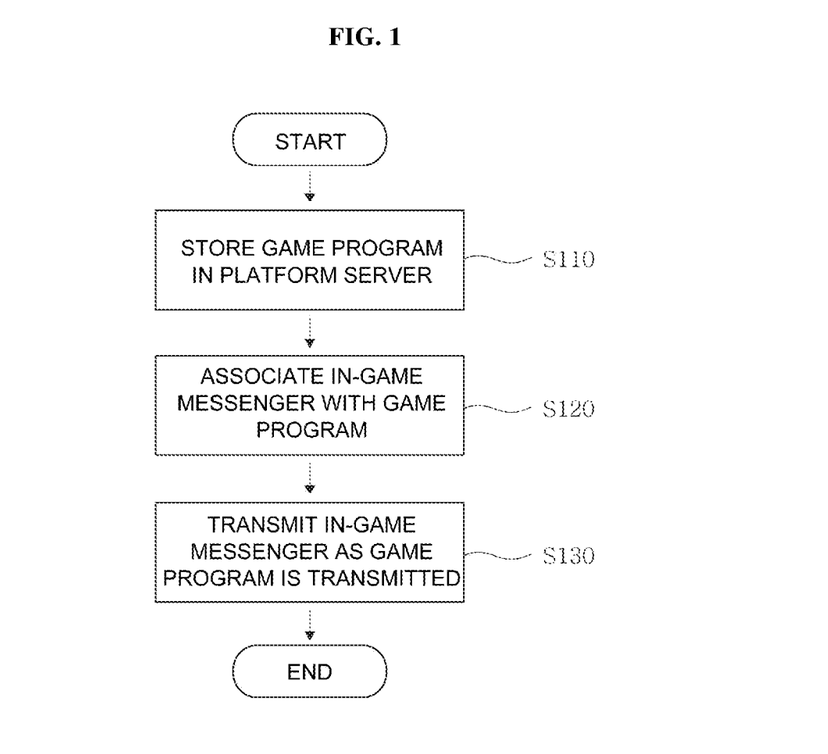
FIG. 1 is a flowchart for illustrating a method for providing an in-game messenger service according to an embodiment of the present disclosure.

FIG. 1 is a flowchart for illustrating a method for providing an in-game messenger service according to an embodiment of the present disclosure.

Referring to FIG. 1, there is provided a method for providing an in-game messenger service including: storing a game program in a platform server (S110); associating an in-game messenger program for the game program (S120); and transmitting the in-game messenger program associated with the game program to a user terminal as the game program is transmitted from the platform server to the user terminal (S130).

In an embodiment of the present disclosure, the in-game messenger program is associated with two or more games stored in the platform server. Thus, even if only one of a plurality of games provided from the platform server is downloaded, the common in-game messenger may be stored in the user terminal to form a network among them. For example, a user who has downloaded a game A and a user who has downloaded a game B may use a common in-game messenger capable of exchanging messages with each other even if the games are different, as long as the games are downloaded from the same platform.

In an embodiment of the present disclosure, if the game is played, the in-game messenger is partially displayed on a game screen of the user terminal in which the game is played. However, if the game is not played, the in-game messenger may be displayed as a separate icon on the user terminal.

In other words, unlike the conventional art where a game and an instant messenger are operated independently, in the present disclosure, a game function and a messenger function are combined, and the messenger is associated with different kinds of games provided on the same platform so that the messenger may be used extensively among users.

According to the present disclosure, the in-game messenger can be embedded in the game program through a common software development kit (SDK) provided to the game developer from the platform server. In other words, it is possible to connect messenger between disparate games through the in-game messenger embedded in the software development kit provided to the game developer by the platform service provider.

Figure 2:
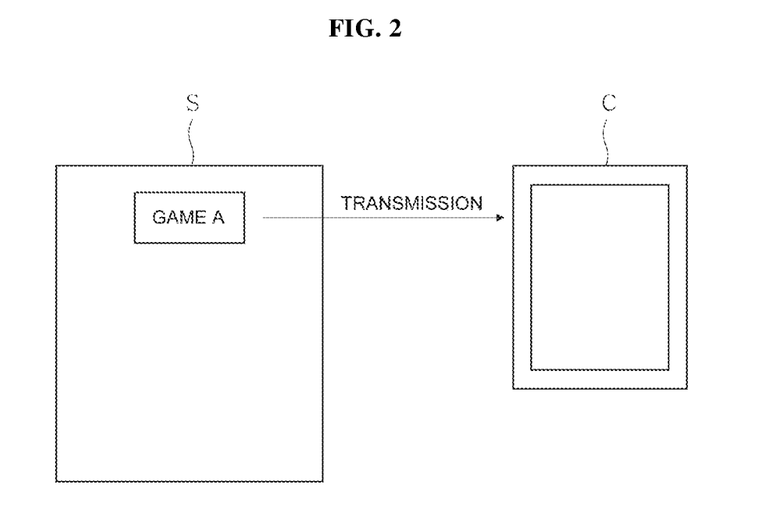
FIGS. 2 to 4 are diagrams for illustrating a method for transmitting an in-game messenger according to an embodiment of the present disclosure.
Figure 3:
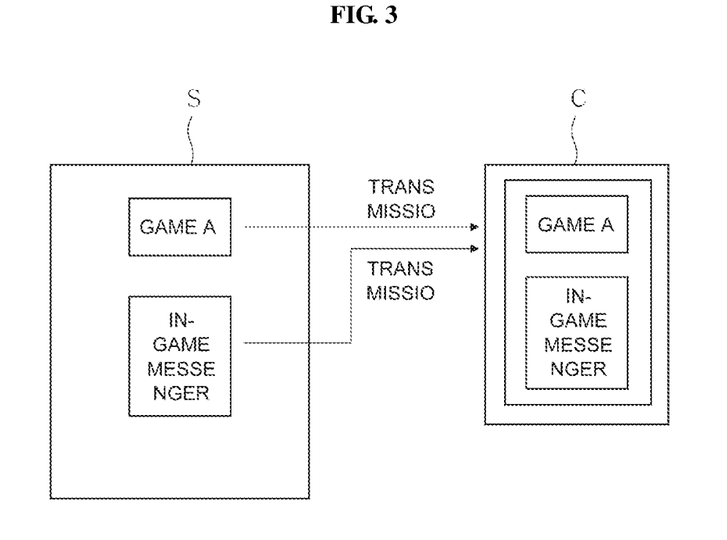
Figure 4:
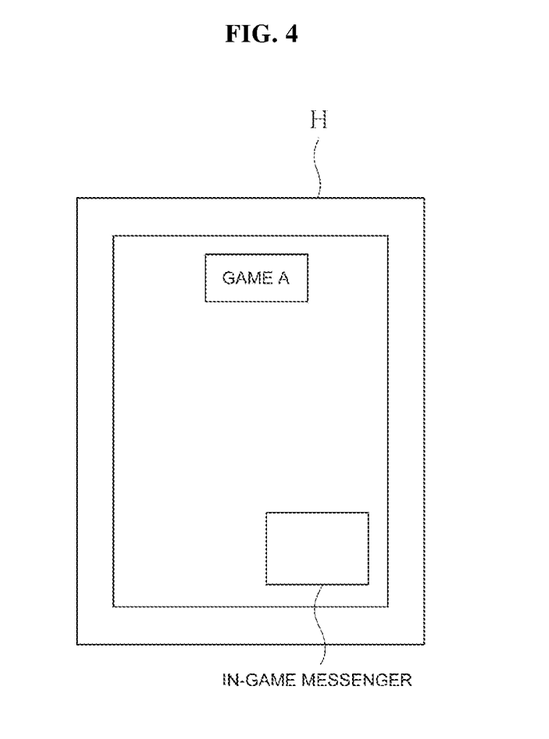

FIGS. 2 to 4 are diagrams for illustrating a method for transmitting an in-game messenger according to an embodiment of the present disclosure.

Referring to FIG. 2, first, a user selects a game program A from the platform server S by operating the user terminal H and receives the game program A from the user terminal H.

Referring to FIG. 3, as the game program A is received from the platform server to the user terminal, the in-game messenger B associated with the game program A is also transmitted to the user terminal and downloaded to the user terminal. In particular, in the present disclosure, the in-game messenger B is associated with all game programs stored in the platform server S and sent to the user terminal.

Referring to FIG. 4, as the game program A is activated and played, the in-game messenger is activated, and the in-game messenger may be displayed on a screen of the game program A.

As described above, in the present disclosure, as long as the game program is transmitted from the platform server S and played, users may exchange messages or obtain user information even between different kinds of games. This will be described in more detail in the following embodiment.

Figure 5:
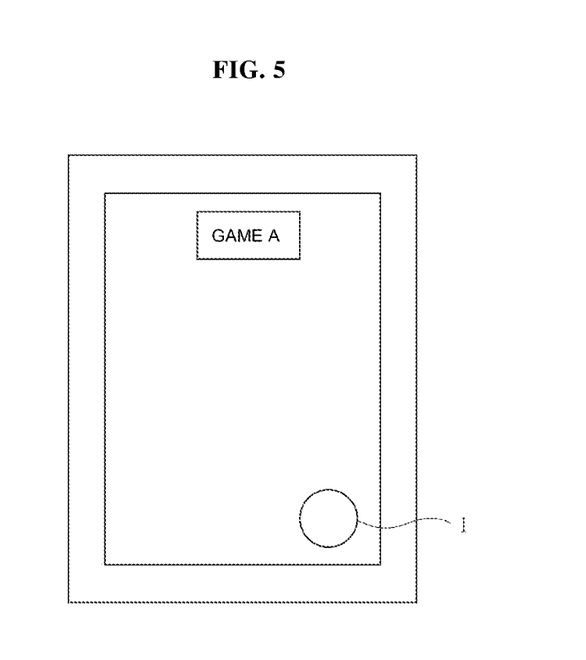
FIGS. 5 to 7 are diagrams showing examples of using the in-game messenger according to an embodiment of the present disclosure.
Figure 6:
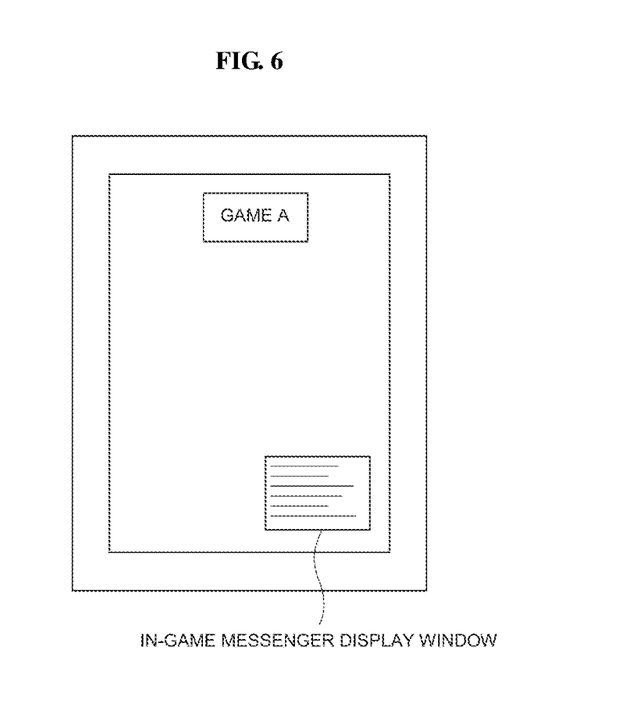
Figure 7:
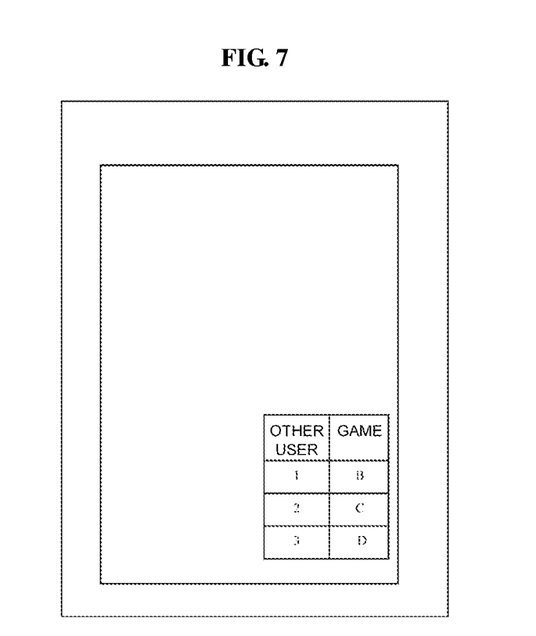

FIGS. 5 to 7 are diagrams showing examples of using the in-game messenger according to an embodiment of the present disclosure.

Referring to FIG. 5, an icon I for activating the in-game messenger is displayed on a play screen of a game A.

Referring to FIG. 6, if the icon I is activated by operating the user terminal manipulation (for example, by touch or the like), an in-game messenger display window is generated and displayed on the screen of the user terminal.

Referring to FIG. 7, the in-game messenger display window displays other users 1, 2, 3 who use the in-game messenger, as the game is received from the platform server. Further, information b, c, d of games played by other users (namely, games transmitted from the same platform server) is displayed in the in-game messenger display window. In other words, another user who receives a game B from the platform server and plays the game B may also exchange messages by means of the in-game messenger of the user who plays the game A. Further, it is also possible for any user to check what kind of game is played by the other user.

Thus, in the present disclosure, when a user downloads a game from the platform server, the in-game messenger is also downloaded simultaneously, and a social network may be formed between the user and another user who has downloaded a game program from the same platform server.

Figure 8:
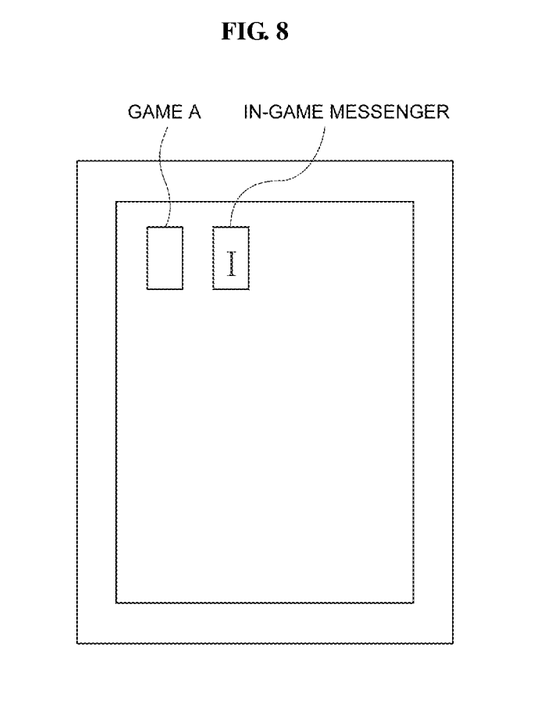
FIG. 8 is a diagram showing that an in-game messenger icon I depicted in FIG. 5 is independently separated from a game screen and activated at a user terminal independently.

FIG. 8 is a diagram showing that an in-game messenger icon I depicted in FIG. 5 is independently separated from a game screen and activated at a user terminal independently.

Referring to FIG. 8, as the game program is received from the platform server, an in-game messenger icon I associated with the game program is displayed on the screen of the user terminal as a separate icon. Thus, the in-game messenger provided together with the game may be independently activated separately from the game, so that a message may be sent even when the game is not played.

Figure 9:
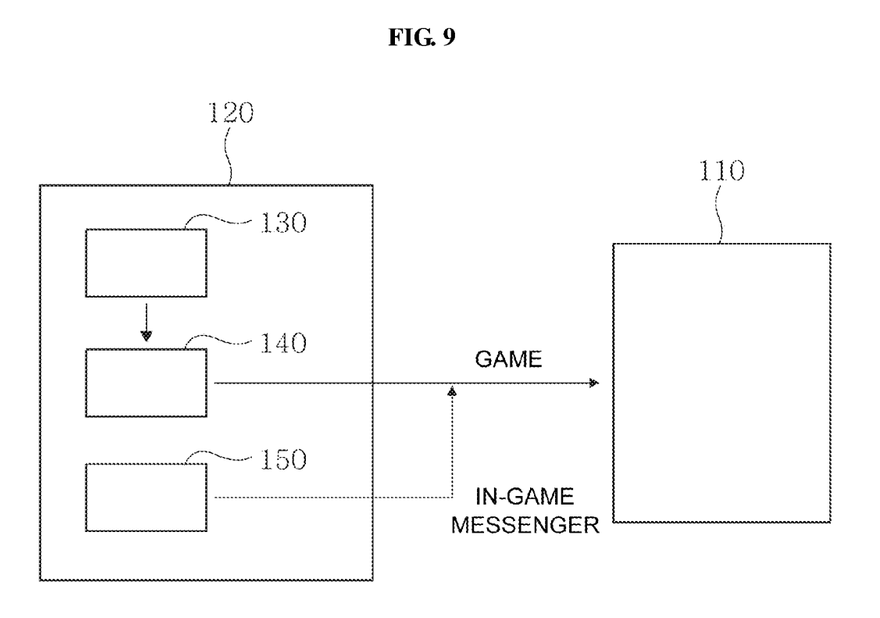
FIG. 9 is a diagram showing an in-game messenger apparatus according to an embodiment of the present disclosure.

FIG. 9 is a diagram showing an in-game messenger apparatus according to an embodiment of the present disclosure.

Referring to FIG. 9, the in-game messenger apparatus includes a user terminal 110; and a platform server 120 connected to the user terminal through a network. The platform server 120 includes a game program storage unit 130; a game program transmission unit 140 configured to transmit a game program stored in the game program storage unit 130 to the user terminal 110 according to a transmission signal received from the user terminal 110; and an in-game messenger transmission unit 150 configured to transmit an in-game messenger program to the user terminal 110 when the game program is transmitted from the game program transmission unit 140.

In an embodiment of the present disclosure, if the game program is transmitted from the game program transmission unit 140 to the user terminal 110, the in-game messenger transmission unit 150 automatically transmits an in-game messenger program to the user terminal 110.

The method and apparatus for providing an in-game messenger service as described above may be implemented using program commands for implementing the same, and a computer-readable recording medium on which the program commands are recorded includes, for example, ROM, RAM, CD-ROM, a magnetic tape, a floppy disk, an optical media storage, and the like.

In addition, the computer-readable recording medium on which a program is recorded may be distributed to computer devices connected via a network, and computer-readable codes may be stored and executed in a distributed manner. In this case, one or more of the plurality of distributed computers may execute some of the functions proposed above and transmit the results of the execution to one or more of the other distributed computers, and a computer receiving the results may also perform some of the functions described above and provide the results to other distributed computers as well.

A computer that is readable a recording medium on which an application, which is a program for operating the method and apparatus for providing an in-game messenger service according to each embodiment of the present disclosure, is recorded, may include a general PC such as a desktop or a notebook as well as a mobile terminal such as a smart phone, a tablet PC, a PDA (Personal Digital Assistants) and a mobile communication terminal. Moreover, the computer should be interpreted as any kind of device capable of computing.

It will be understood by those skilled in the art that the above description of the embodiments is for illustrative purposes and can be easily modified without departing from the scope or essential characteristics of the present disclosure. Therefore, the above embodiments should be understood as being illustrative and not restrictive in all aspects. For example, each component described as an integrated form may be implemented in a distributed form, and components described as being distributed may also be implemented in a combined form.

The scope of the present disclosure is defined by the appended claims rather than the detailed description, and all changes or modifications derived from the meaning and scope of the claims and their equivalents should be interpreted as falling within the scope of the present disclosure.

The invention claimed is:

1. A method for providing an in-game messenger service comprising:
    storing a plurality of game programs in a platform server;
    developing the plurality of game programs through a software development kit provided by the platform server;
    associating an in-game messenger program for the plurality of game programs; and
    transmitting the in-game messenger program associated with the game program to a user terminal as one of the plurality of game programs is transmitted from the platform server to the user terminal,
    wherein the in-game messenger program is embedded in the software development kit, can be commonly linked to two or more games stored in the platform server, and has first and second icons,
    wherein the first icon for activating the in-game messenger program is displayed on a game program screen, and as the first icon is selected, an in-game messenger program display window is displayed, wherein the second icon is separated from the game program screen and is installed independently on the user terminal, and as the second icon is selected, the in-game messenger program is independently operated regardless of whether the game is operated.

2. The method for providing an in-game messenger service of claim 1, wherein as the game program is transmitted to the user terminal, the in-game messenger program associated with the game program is automatically transmitted to the user terminal.

3. The method for providing an in-game messenger service of claim 1, wherein a display window of the in-game messenger is displayed on a screen of the game program displayed at the user terminal.

4. The method for providing an in-game messenger service of claim 3, wherein the first icon for activating the in-game messenger is displayed on the game program screen, and as the icon is selected, the in-game messenger display window is displayed.

5. The method for providing an in-game messenger service of claim 1, wherein the in-game messenger program is jointly associated with two or more games stored in the platform server.

6. The method for providing an in-game messenger service of claim 3, wherein information of another user using the in-game messenger and information of a game played by another user is displayed in the in-game messenger display window.

7. The method for providing an in-game messenger service of claim 6, wherein the game information is information of a game transmitted to another user from the platform server.

8. A non-transitory computer readable medium, on which a program command is recorded for implementing the method for providing an in-game messenger service of claim 1.

9. An in-game messenger apparatus comprising:
a user terminal; and
a platform server connected to the user terminal through a network,
wherein the platform server comprising:
a game program storage module that stores a plurality of game programs developed through a software development kit provided from the platform server;
a game program transmission module that transmits a game program stored in the game program storage module to the user terminal according to a transmission signal received from the user terminal; and
an in-game messenger transmission module that transmits an in-game messenger program to the user terminal when one of the plurality of game programs is transmitted from the game program transmission module,
wherein the in-game messenger program is embedded in the software development kit, can be commonly linked to two or more games stored in the platform server, and has first and second icons,
wherein the first icon for activating the in-game messenger program is displayed on a game program screen, and as the first icon is selected, an in-game messenger program display window is displayed,
wherein the second icon is separated from the game program screen and is installed independently on the user terminal, and as the second icon is selected, the in-game messenger program is independently operated regardless of whether the game is operated,
wherein the game program transmission module and the in-game messenger transmission module are stored in memory, and executed to perform the functionality.

10. The in-game messenger apparatus of claim 9, wherein when the game program is transmitted from the game program transmission module to the user terminal, the in-game messenger transmission module automatically transmits the in-game messenger program to the user terminal.

11. The in-game messenger apparatus according to claim 9, wherein information of another user using the in-game messenger and information of a game played by another user is displayed in an in-game messenger display window that is transmitted to the user terminal and activated.

12. A non-transitory computer readable medium, on which a program command is recorded for operating the in-game messenger apparatus of claim 9.

* * * * *